(12) United States Patent
Ai et al.

(10) Patent No.: US 7,843,095 B2
(45) Date of Patent: Nov. 30, 2010

(54) FRICTION DRIVE SPINDLE UNIT

(75) Inventors: Xiaolan Ai, Massillon, OH (US); Dan Czekansky, Dennison, OH (US); David K. Lawrentz, Louisville, OH (US); Josh Cowan, Canton, OH (US)

(73) Assignee: The Timken Company, Canton, OH (US)

( * ) Notice: Subject to any disclaimer, the term of this patent is extended or adjusted under 35 U.S.C. 154(b) by 103 days.

(21) Appl. No.: 12/063,811

(22) PCT Filed: Aug. 18, 2006

(86) PCT No.: PCT/US2006/032315

§ 371 (c)(1),
(2), (4) Date: Feb. 14, 2008

(87) PCT Pub. No.: WO2007/024681

PCT Pub. Date: Mar. 1, 2007

(65) Prior Publication Data

US 2008/0218014 A1    Sep. 11, 2008

Related U.S. Application Data

(60) Provisional application No. 60/709,949, filed on Aug. 19, 2005.

(51) Int. Cl.
*H02K 7/10* (2006.01)
*F16H 13/14* (2006.01)
*B23K 20/12* (2006.01)

(52) U.S. Cl. ............... 310/67 R; 310/83; 475/195; 228/2.1

(58) Field of Classification Search ............ 310/83, 310/67 R
See application file for complete search history.

(56) References Cited

U.S. PATENT DOCUMENTS

| 4,981,403 A * | 1/1991 | Katayama ............... 409/136 |
| 6,517,461 B2 * | 2/2003 | Shimizu ................. 475/216 |
| 7,070,402 B2 * | 7/2006 | Ai et al. ................. 418/61.3 |

(Continued)

FOREIGN PATENT DOCUMENTS

DE    19632046 A1 *    12/1998

(Continued)

*Primary Examiner*—Quyen Leung
*Assistant Examiner*—Terrance Kenerly
(74) *Attorney, Agent, or Firm*—Folster, Lieder, Woodruff & Lucchesi, LC

(57) ABSTRACT

A spindle unit (A) for effecting a manufacturing or repair procedure includes a spindle assembly (2) having a spindle (12) that holds a tool (B), an electric motor (4), and a friction drive transmission (6) located between the spindle assembly and the motor. The transmission includes a sun roller (86) driven by the motor, an outer ring (110) coupled to the spindle, and a pair of support rollers (90) located between the sun roller and outer ring to position the outer ring eccentric to the sun roller and create a wedge gap (126) between the sun roller and the outer ring. The transmission also has a loading roller (96) located at the wedge gap such that it can displace laterally and lodge tightly in the wedge gap. The spindle rotates in bearings (14, 16), one of which is a single row tapered roller bearing that transfers thrust loads developed during the procedure.

18 Claims, 4 Drawing Sheets

U.S. PATENT DOCUMENTS

| | | | |
|---|---|---|---|
| 7,216,723 B2 * | 5/2007 | Ohtsu et al. | 173/2 |
| 7,273,134 B2 * | 9/2007 | Schack et al. | 188/72.8 |
| 7,309,941 B2 * | 12/2007 | Murota et al. | 310/268 |
| 2003/0125150 A1 * | 7/2003 | Tanzer | 475/150 |
| 2003/0160530 A1 * | 8/2003 | Horng et al. | 310/91 |
| 2004/0048712 A1 * | 3/2004 | Ai | 475/162 |
| 2004/0071559 A1 * | 4/2004 | Ai et al. | 417/220 |
| 2004/0121601 A1 * | 6/2004 | Ai et al. | 438/689 |

FOREIGN PATENT DOCUMENTS

| | | |
|---|---|---|
| EP | 1557233 | 7/2005 |
| JP | 2004072843 | 3/2004 |
| WO | WO2004/029480 | 4/2004 |

* cited by examiner

FRICTION DRIVE SPINDLE UNIT

RELATED APPLICATION

This application derives and claims priority from U.S. provisional application 60/709,949 filed 19 Aug. 2005, and from International Application PCT/US2006/032315 (WO 2007/024681), filed on 18 Aug. 2006, by The Timken Company, both of which are incorporated herein by reference.

TECHNICAL FIELD

This invention relates to spindle units and more particularly to a spindle unit that has a high power density.

BACKGROUND ART

Many manufacturing and repair procedures rely on rotating spindles, and some require spindles that are driven by spindle units that are more or less separable from the components that support them. For example, certain milling and boring operations are performed by robotic equipment that maneuver spindle units and the rotating tools driven by such units. This equipment requires spindle units that are light in weight and highly compact, yet capable of developing high torques. In other words, the spindle units should have a high power density.

Friction stir welding (FSW) is another example of a manufacturing procedure, that relies on spindle units. This relatively new welding technique which has gained increasing popularity, is primarily used for materials, such as aluminium, that do not accommodate fusion welding well. FSW uses a cylindrical shoulder tool with profiled pin that is rotated and slowly plunged into the joint line between two workpieces of metal sheet or plate. Frictional heat that is generated at the joint softens the material of the workpieces without reaching the melting point and allows the tool to traverse the welding line, leaving a solid phase bond between the two workpieces.

Two power sources can be used to power a spindle of a spindle unit, whatever the procedure accomplished by it: a hydraulic motor or an electric motor. There are obvious advantages for using electric motors, these including ease of use, mobility and good control. The major disadvantage is, however, the power density. Typically, the electric motor is coupled directly to a tool and rotates the tool at a relatively low velocity, while delivering high torque. This requires a large and heavy motor.

One solution to improve motor power density is to increase the motor speed and use so-called gear-head motor where a gear reduction unit is integrated with an electric motor. The smaller motor operates at a higher speed but produces less torque. The gear head reduces the speed and increases the torque. There are many types of gear head motors including precision gear head motors, which are capable of running at higher speeds and generally are much more expensive than "regular" gear head motors. However, even with precision gear heads, electric motors are often limited to operating speeds of 5,000 to 6,000 rpm. This has, to a large degree, prevented the electric motors from achieving their ultimate power-density potentials.

BEST MODE OF CARRYING OUT THE INVENTION

Figure 1:
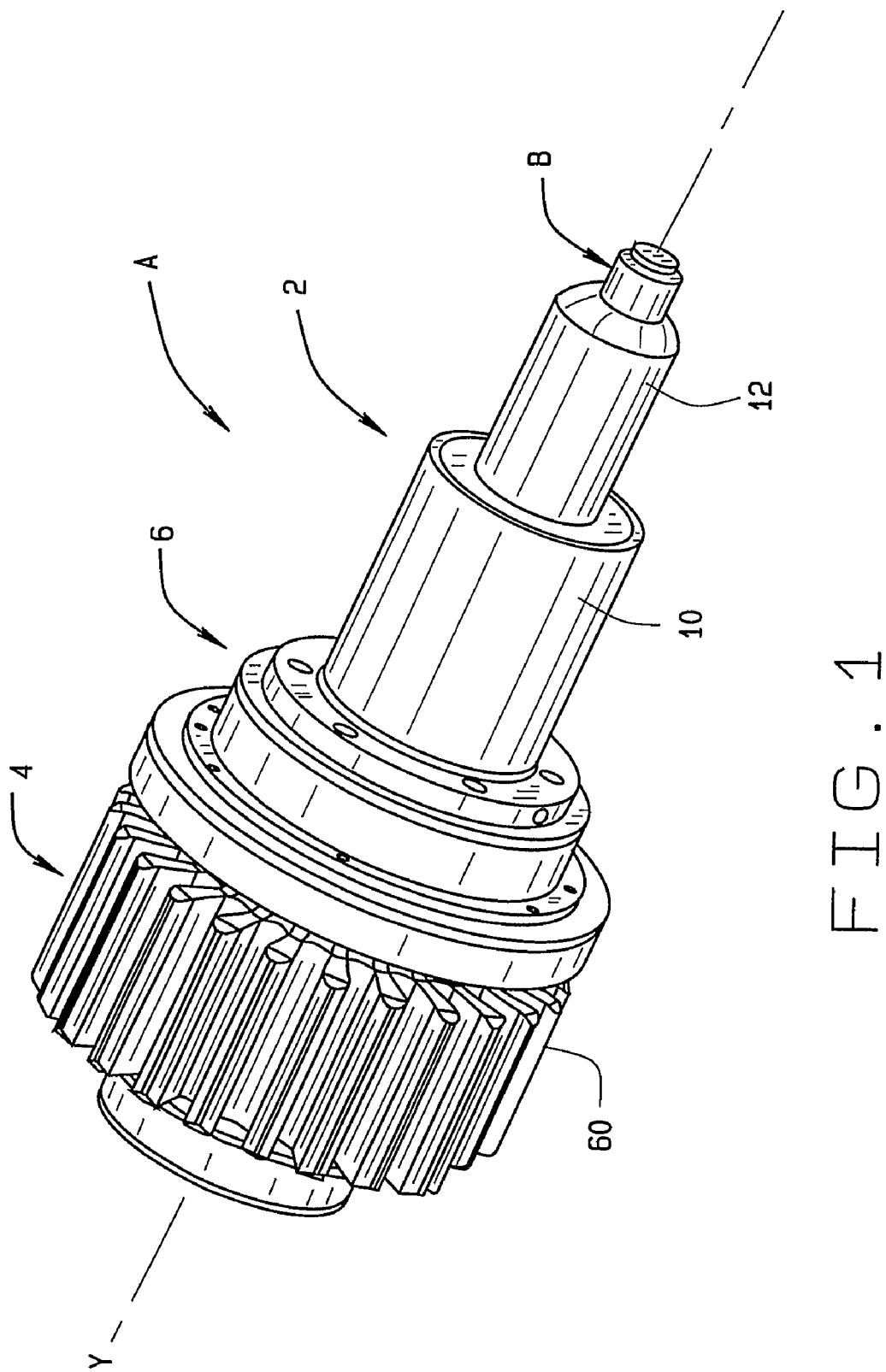
FIG. 1 is a perspective view of a spindle unit constructed in accordance with and embodying the present invention.

Referring now to the drawings, a spindle unit A (FIG. 1) holds tool B that it rotates, performing a manufacturing or repair procedure, which could be friction stir welding. The unit A, although relatively small, applies considerable torque to the tool B while rotating the tool B at relatively low velocity, as low as 2000 rev/min. The unit A includes a spindle assembly 2 that actually holds the tool B, an electric motor 4, and a friction drive transmission 6 that couples the spindle assembly 2 with the motor 4. The spindle assembly 2 is organized about an axis X, whereas the motor 4 delivers power along another axis Y that is offset from the axis X, yet parallel to it.

Figure 3:
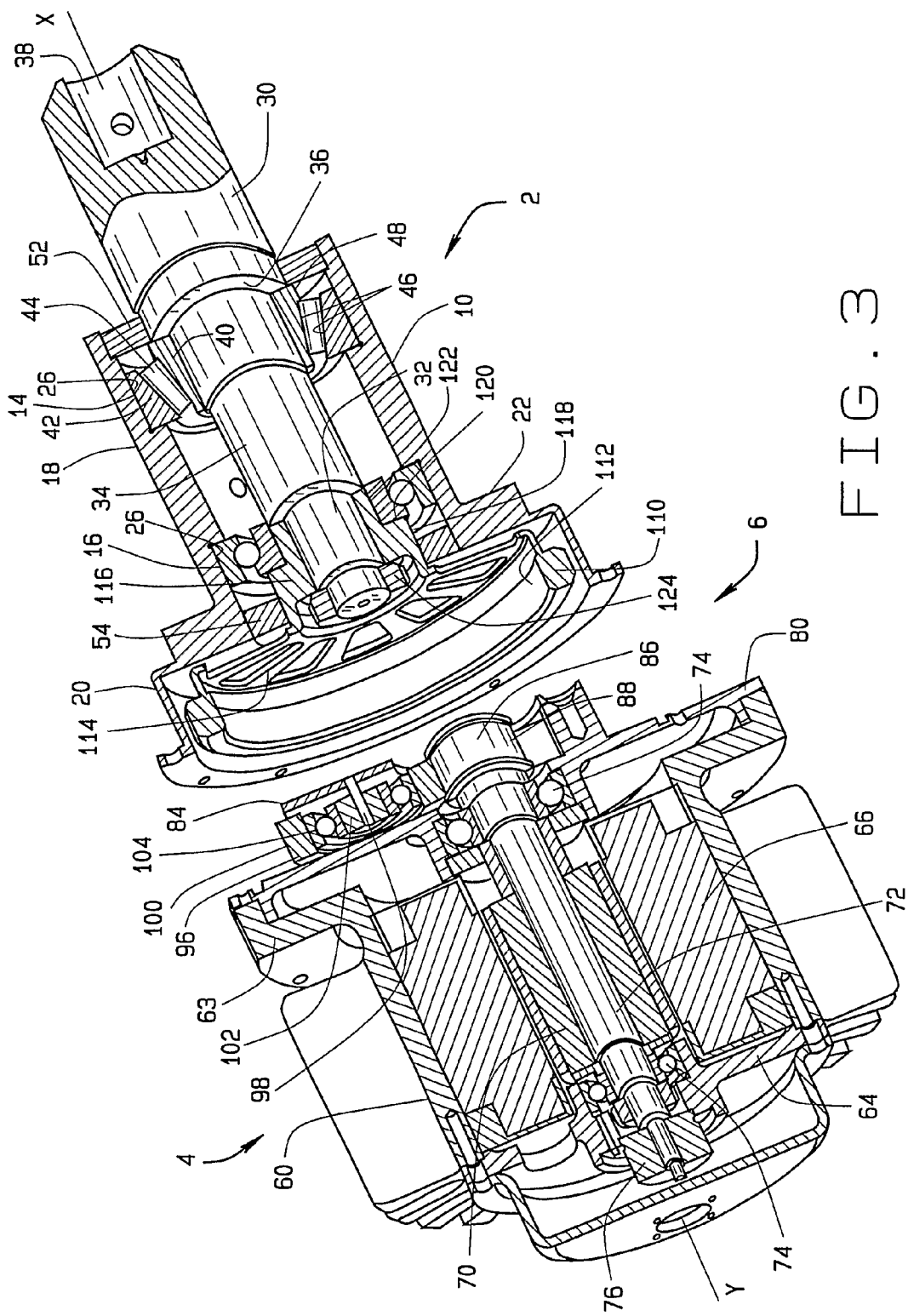
FIG. 3 is an exploded perspective view, partially broken away and in section, of the spindle unit.

The spindle assembly 2 includes (FIG. 3) a housing 10 and a spindle 12 that rotates in the housing 10 on a head bearing 14 and a tail bearing 16. The housing 10 has an extended barrel 18 and an enlarged end 20 at one end of the barrel 18. The two merge at a shoulder 22 out of which threaded holes 24 open. The housing 10 contains two bearing seats 26, one at the forward end of the barrel 18. The spindle 12 has a head 30 that projects from the barrel 18 of the housing 10, and a reduced end 32 that projects from the opposite end of the barrel 18 into the enlarged end 20 of the housing 10. Between the head 30 and the reduced end 32 is an intermediate section 34 that merges into the head 30 at shoulder 36. The head 30 at its opposite end, that is the end beyond the housing 10, has a socket 38 that opens axially out of it for receiving the tool B.

The head bearing 14 lies forwardmost on the spindle 12 close to where the head 30 of the spindle 12 emerges from the barrel 18 of the housing 10. It should have the capacity to transfer a heavy thrust load between the housing 10 and spindle 12 and also a heavy radial load, and to that end preferably takes the form of a single row tapered roller bearing. As such, it has an inner race in the form of a cone 40, an outer race in the form of a cup 42, and rolling elements in the form of tapered rollers 44. The cone 40 and cup 42 have opposed raceways 46 that are inclined with respect to the axis X. The rollers 44 along their tapered side faces contact— essentially with line contact—the raceways 46. At the large end of its raceway 46 the cone 40 has a thrust rib 48 against which the large end faces of the rollers 44 bear, thus preventing the rollers 44 from being expelled from the annular space between the raceways 46. The cone 40 fits over the intermediate section 34 of the spindle 12 with its back face, that is the face through which thrust loads are transferred, being against the shoulder 36 at the end of the intermediate section 34. The cup 42 fits into the forward bearing seat 26 in the barrel 18 with its back face against the shoulder at the end of that seat 26. The tail bearing 16 fits into the rear bearing seat 26 in the enlarged end 20 of the housing 10 where it bears against the shoulder at the end of that seat 26. Here it surrounds the reduced end 32 of the spindle 12. The tail bearing 16 may take the form of an angular contact ball bearing.

The interior of the barrel 10 and the bearings 14 and 16 within it are isolated from the surrounding environment by a front seal 52 that fits into the forward end of the barrel 18 and around the head 30 of the spindle 12 and a rear seal 54 that fits into the enlarged end 20 immediately behind the tail bearing 16. The seals 52 and 54 retain grease within the barrel 18 of the housing 10 and prevent oil from entering the barrel 18 where it might dilute grease in the bearings 14 and 16 and render the grease less effective as a lubricant. The seals 52 and 54 also exclude dirt and other debris.

The electric motor 4 preferably takes the form of an induction-type alternating current motor. It includes (FIG. 3) a housing 60 having a flange 62 at its forward end and an end plate 64 at its rear end, with the latter being detachable from the remainder of the housing 60. The housing 60 supports a stator 66 that lies between the flange 62 and plate 64. The electric motor 4 also includes a rotor 70 having a shaft 72 that extends through the housing 60. The rotor 70 is supported in the housing 60 by two antifriction bearings 74, both of which fit around the shaft 72, with one being at the flange 62 and the other in the end plate 64. The bearings 74 enable the rotor 20 to rotate about the axis Y with minimal friction. The shaft 72 projects beyond the end plate 64 and here is fitted with a resolver 76 that is a feedback device that includes both a stator and a rotor.

Figure 2:
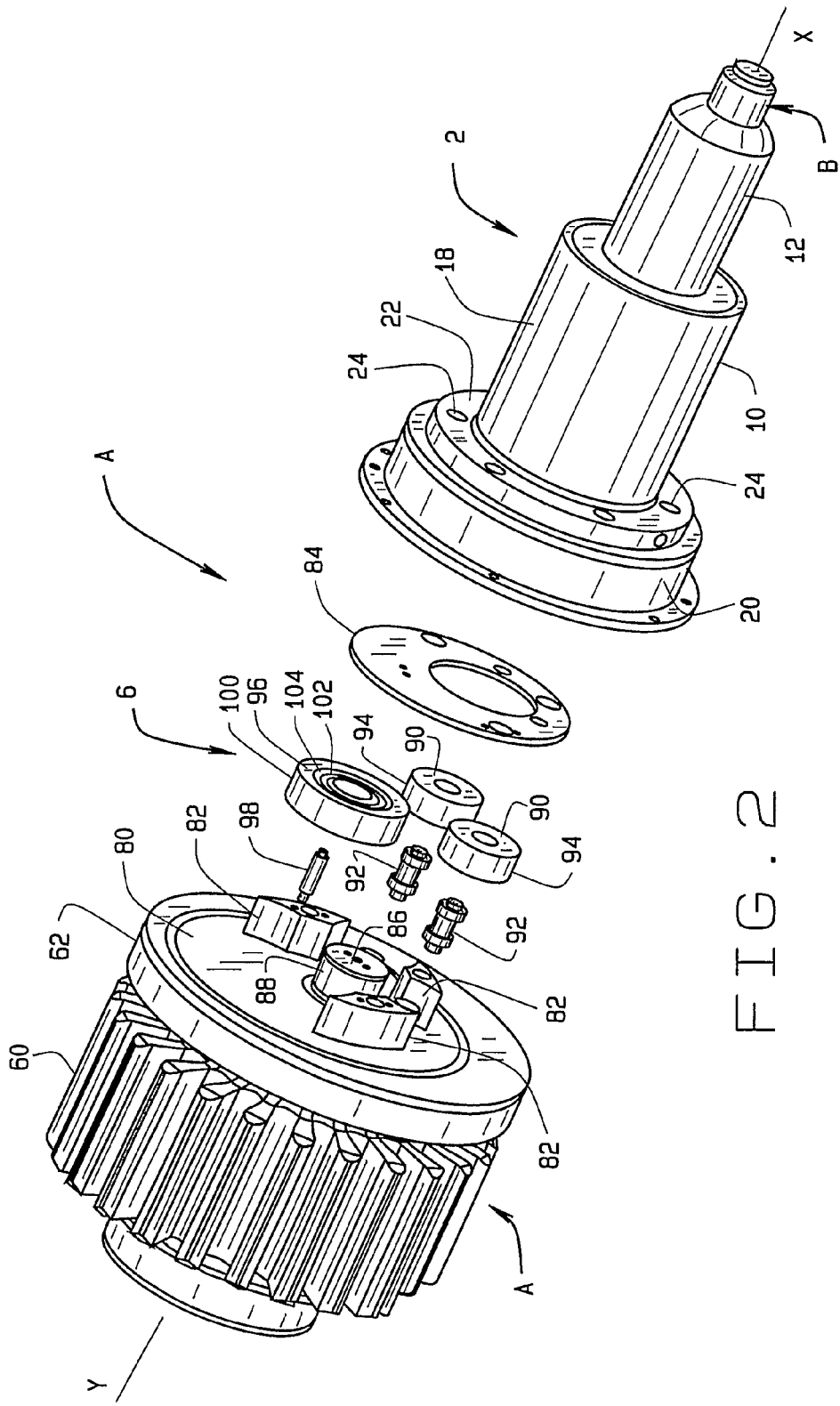
FIG. 2 is a perspective view of the spindle unit showing its transmission exploded.

The friction drive transmission 6 transfers power from the motor 4 to the spindle 12 of the spindle unit 2 It includes (FIGS. 2 & 3) a carrier base 80 that is secured firmly against the flange 62 at the forward end of the motor housing 60, preferably with machine screws. The carrier base 80 holds the front antifriction bearing for the rotor 70 and supports three spacers 82 that project forwardly from it. The spacers 82, in turn, support a carrier plate 84, positioning it forwardly from carrier base 80.

The shaft 72 for the rotor 70 of the motor 4 projects through the carrier base 80 and in the region between the carrier base 80 and the carrier plate 84 is provided with a sun roller 86 having a cylindrical peripheral surface 88. The sun roller 86 forms part of the friction drive transmission 6, but even so it may be formed integral with the rotor shaft 72. The sun roller 86 rotates about the axis Y and is surrounded by the spacers 82 that separate the carrier base 80 and the carrier plate 82.

In addition to the sun roller 86, the transmission 6 includes a pair of support rollers 90 that rotate on pins 92 that are secured at their ends in the carrier base 80 and carrier plate 84. Thus, the pins 92 provide fixed axes about which the support rollers 90 revolve, and those axes lie parallel to the axis X and Y. The support rollers 90 likewise fit between the two of the spacers 82, and each has a cylindrical peripheral surface 94 along which contacts the cylindrical surface 88 of the sun roller 86.

Complementing the two support rollers 90 is a loading roller 96 that rotates about a pin 98 in the space between two of the three spacers 82 and likewise has its ends set into the carrier base 80 and carrier plate 84. The loading roller 96 has a peripheral surface 100 that also contacts the peripheral surface 88 of the sun roller 86. In contrast to the support rollers 90, the loading roller 96 does not rotate about an axis that is fixed with respect to the carrier base 80 and carrier base 84. To be sure, the axis of rotation for the loading roller 96 remains parallel to the axes X and Y and the ends of the pin 98 may be fixed in the carrier base 80 and carrier plate 84, but even so, the loading roller 96 is free to shift laterally. To this end, it may rotate about the pin 98 on a flexible mounting that may take the form of an elastomeric bushing 102 located between pin 98 and the roller 96. Actually, the bushing 102 fits within an antifriction bearing 104 that in turn fits within the loading roller 96. On the other hand, the ends of the pin 98 may be free for limited displacement in the carrier base 80 and carrier plate 84, thus eliminating the bushing 102.

Finally, the transmission 6 has an outer ring 110 (FIG. 3) that rotates about the axis X of the spindle assembly 2 and has a cylindrical internal surface 112 that lies concentric to the axis X. Both of the support rollers 90 along their peripheral surfaces 94 and the loading roller 96 along its peripheral surface 100 contact the outer ring 110 along its internal surface 112. The ring 110 rotates within the enlarged end 20 of the housing 10 for the spindle assembly 2 and includes a web 114 that is directed inwardly toward the axis X beyond the carrier plate 84. The web 114 merges into a sleeve 116 that is directed away from the carrier plate 84 and over the reduced end 32 of the spindle 12. Indeed, the outer ring 110 is coupled to the spindle 12 through a key that engages both the sleeve 116 of the ring 110 and the reduced end 34 of the spindle 12. The sleeve 116 has an enlarged sealing surface 118 adjacent to the web 114, and it fits within the rear seal 54 to establish a dynamic fluid barrier along the sealing surface 118. Beyond the journal 118, the sleeve 116 has a shoulder 120 and a bearing seat 122 that projects beyond the shoulder 120. The journal 122 fits into the tail bearing 16, so that the bearing 16 supports the rear end of the spindle 12, with the shoulder 120 being against the end of the bearing 16. The reduced end 32 of the spindle 12 projects completely through the sleeve 116 and beyond a sleeve 116 is fitted with a nut 124 that is turned down against the end of the sleeve 116 to secure the outer ring 110 to the spindle 12. The nut 124 also controls the setting of the bearings 14 and 16, and that setting should preferably enable the bearings 14 and 16 to operate without internal clearances.

Figure 4:
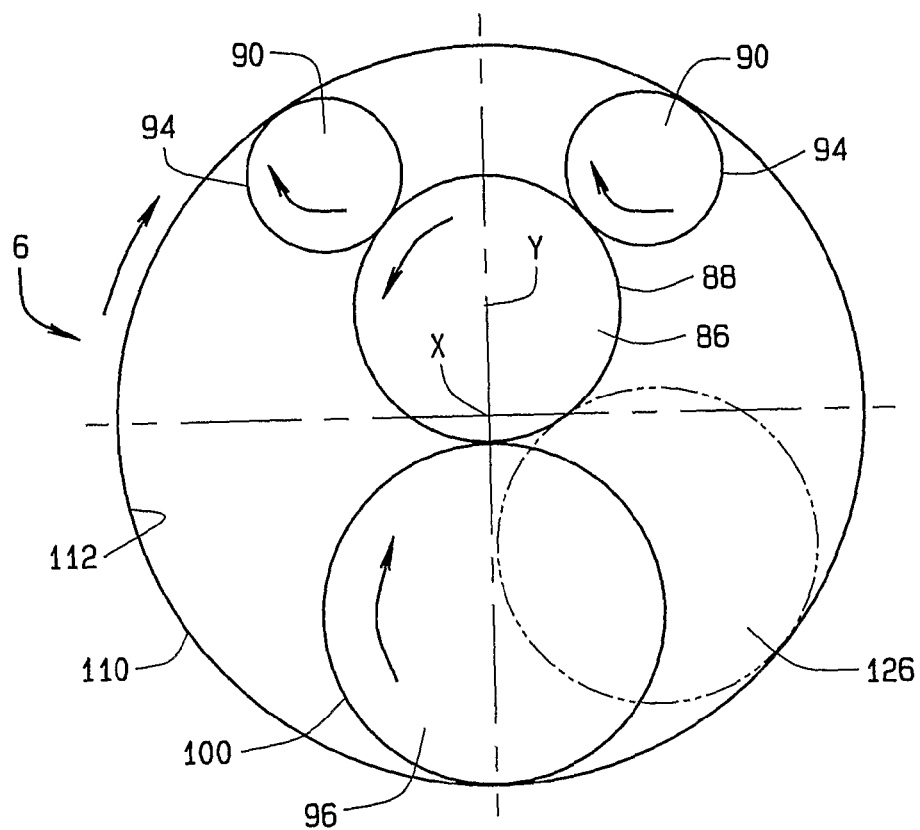
FIG. 4 is a schematic view of the transmission for the spindle unit.

The spindle 12 of the spindle assembly 2 actually carries the outer ring 110 of the transmission 6, but when the housing 10 of the spindle assembly 2 at its enlarged end 20 is attached to the flange 62 on the housing 60 of the motor 4, the internal surface 112 of the outer ring 110 surrounds the support rollers 90 and loading roller 96 and contacts peripheral surfaces 94 and 100, respectively, of those rollers. The eccentricity between the sun roller 86 and the internal surface 112 creates a wedge gap 126 (FIG. 4) to the side of the loading roller 96, and owing to the flexibility provided by the bushing 102 in the loading roller 96, the loading roller 96 can displace laterally into the gap 126 (FIG. 4).

U.S. patent application Ser. No. 10/670,408 published 8 Apr. 2004 under No. US-2004-006788-A1 (PCT WO 2004/029480), discloses in more detail a traction drive suitable for use as the transmission 6. It is incorporated herein by reference.

Figure 5:
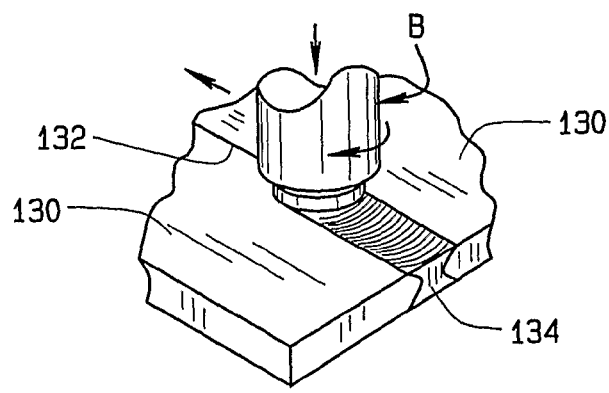
FIG. 5 is a fragmentary perspective view of two plates being joined together with along a friction stir weld produced by a tool powered by the spindle unit.

When the tool B is configured for friction stir welding, the spindle unit A may be used to produce a friction stir weld between two metal plates 130 (FIG. 5) that abut along edges that form a joint 132 between of those plates 130. To this end, the shoulder tool B is installed on the spindle 12 of the spindle unit A by inserting it into the socket 38 at the end of the spindle 12. Thereupon, the spindle unit A is maneuvered to align its spindle 12 and the end face of the tool B in it with the joint 132 between the two plates 130. The motor 4 is energized, thus imparting rotation to the spindle 12 and tool B, and by a force applied to the unit A, the end of the tool B is urged firmly against the plates 130. Thereupon, the entire unit A is moved over the plates 130 to advance the tool B along the joint 132 between them. Friction between the rotating tool B and the plates 132 along the joint 132 elevates the temperature of the metal at the joint, leaving it somewhat plastic but not molten. As a consequence, a solid phase bond develops between the two plates 130 at the joint 132. The bond is a friction stir weld 134.

The spindle 12 and the tool B in it rotate relatively slowly on the order of 2000 rev/min. The rotor 70 of the motor 4, however, rotates at a considerably higher velocity. The reduction in velocity occurs in the transmission 6 along with an increase in torque. In particular, the sun roller 86 of the transmission 6, being on the rotor 70 of the motor 4, rotates at the high velocity of the rotor 70. It transfers torque to the outer ring 110 through the supporting rollers 90 and the loading roller 96. The torque so transmitted turns the outer ring 110, and the outer ring 110, being coupled at its sleeve 116 to the spindle 12, rotates the spindle 12 and the tool B on it. Since the diameter of the internal surface 112 on the outer ring 110 is considerably larger than the diameter of the peripheral surface 88 on the sun roller 86, the outer ring 112 and spindle 12 rotate at a velocity considerably less than the velocity at which the sun roller 86 and rotor 70 turn.

Although the torque developed at the spindle 12 is high, the transfer of torque from the sun roller 86 to the outer ring 110 occurs without slippage, this being a consequence of the wedge gap 126 established by the eccentricity between the sun roller 86 and the outer ring 110 and the capacity of the loading roller 96 to move into the wedge gap 126. In particular, when the sun roller 86 rotates, it exerts a tangential force on the loading roller 96 where the peripheral surfaces 88 and 100 of the two rollers 86 and 96 contact each other. That force urges the loading roller laterally (FIG. 4). Since the bushing 102 permits a measure of displacement between the loading roller 96 and the pin 98 about which the loading roller 96 rotates, the loading roller 96, under the force exerted, moves into the wedge gap 126 to its side and there becomes lodged even more tightly between the peripheral surface 88 on the sun roller 86 and the internal surface 112 on the outer ring 110. The forces at the lines of contact between the sun roller 86 and the support and loading rollers 90 and 96 and between the latter and the outer ring 110 increase, and this increases the friction at those lines of contact. As a consequence, the transmission 6 enables considerable torque to be applied to the outer ring 110 and the spindle 12 that is coupled to it.

The axially directed force that is applied to the spindle unit A and resisted at the plates 130 which the unit A welds together, is transferred from the housing 10 to the spindle 12 through the head bearing 14. Being a tapered roller bearing, the bearing 14 possesses the capacity to transfer radial loads and also axial or thrust loads, with the latter being transferred in the direction that seats its tapered rollers 44 against the raceways 46 on the cone 40 and cup 42. The head bearing 14 is oriented accordingly.

Indeed, the spindle unit A may be used wherever a rotating spindle is required to turn a tool, such as a milling cutter or drill or for that matter any other rotatable tool. Its light weight and highly compact configuration render it suitable where weight and space are important considerations, for example, on the arms of robotic equipment. The friction drive transmission A, being totally devoid of gearing, eliminates pulsations from the rotating tool driven by the unit A.

The transmission 6, owing to its capacity to reduce speed and increase torque, allows the motor 4 to remain relatively small. This in turn keeps the size of the spindle unit A suitable for friction stir welding.

Other bearing arrangements capable of transferring radial and thrust loads may be substituted for the head and tail bearings 14 and 16.

The invention claimed is:

1. A spindle unit for rotating a rotatable tool, said spindle unit comprising:
    a spindle assembly including
        a housing having a forward end;
        a spindle rotatable in the housing about a spindle axis and having an enlarged head that is exposed at the forward end of the housing and is configured to drive a rotatable tool, a reduced end located within the housing, and an intermediate section located between the head and the reduced end, the reduced end and intermediate section being smaller in transverse cross section than the head;
        a head bearing supporting the spindle in the housing at the forward end of the housing, and being configured to transfer radial loads between the spindle and housing and also axial loads that urge the spindle into the forward end; and
        a tail bearing also supporting the spindle in the housing and being offset axially from the head bearing;
    an electric motor including a housing and a rotor that revolves in the housing about a motor axis, the housing of the spindle assembly being fixed in position with respect to, but being a separate component from, the housing of the motor; and
    a transmission located between the motor and the spindle assembly and including
        a sun roller driven by the rotor of the motor;
        an outer ring located around the sun roller and coupled as a separate component to the spindle at the reduced end of the spindle, the outer ring being eccentric to the sun roller so that a wedge gap exists between the sun roller and the outer ring;
        support rollers located between the sun roller and the outer ring; and
        a loading roller located between the sun roller and the outer ring such that the wedge gap is located to the side of the loading roller, the loading roller being displaceable so that it fits tightly in the wedge gap when torque is transferred from the sun roller to the outer ring through the loading roller.

2. A spindle unit according to claim 1 wherein the rotor axis is offset from, yet parallel to, the spindle axis.

3. A spindle unit according to claim 2 wherein the sun roller, support rollers, and loading roller have cylindrical peripheral surfaces and the outer ring has a cylindrical internal surface; and wherein the support and loading rollers along their cylindrical peripheral surfaces contact the sun roller along its cylindrical peripheral surface and further contact the outer ring along its cylindrical internal surface.

4. A spindle unit according to claim 3 wherein the sun roller is on the rotor of the electric motor.

5. A spindle unit according to claim 4 wherein the outer ring has a web that is located beyond the sun, support, and loading rollers, and a sleeve that fits over the spindle such that the outer ring is coupled with the spindle of the spindle assembly through its web and sleeve; and wherein a nut retains the sleeve on the spindle and controls the setting of the bearings.

6. A spindle unit according to claim 5 wherein the housing of the spindle assembly encloses the transmission and is attached to the motor.

7. A spindle unit according to claim 1 wherein the head bearing is a single row tapered roller bearing oriented to transfer thrust loads between the housing and the spindle when the spindle is urged toward the transmission.

8. A spindle unit according to claim 7 wherein the tail bearing is a ball bearing.

9. A spindle unit according to claim 8 wherein the outer ring of the transmission includes a web that lies beyond the sun, support, and loading rollers, and a sleeve that projects from the web and receives the end of the spindle; and wherein the tail bearing lies between the housing and the sleeve of the outer ring.

10. A spindle unit according to claim 1 wherein the support and loading rollers of the transmission rotate about pins that are fixed in position with respect to the motor and housing; wherein the support rollers rotate about the axes of the pins that support them, and wherein the loading roller rotates about an axis that can displace laterally with respect to the pin that supports the loading roller.

11. A spindle unit according to claim 10 wherein an elastomeric bushing exists between the loading roller and the pin about which it rotates so that the loading roller can displace laterally.

12. A spindle unit according to claim 10 wherein the transmission further includes a carrier base that is attached to the motor, and a carrier plate spaced from, but secured to the carrier base; and wherein the support and loading rollers are located in the space between the carrier base and the carrier plate.

13. A spindle unit according to claim 1 and further comprising a rotatable tool coupled to the spindle and configured for producing a friction stir weld.

14. A spindle unit according to claim 1 and further comprising seals in the housing of the spindle assembly beyond the head and tail bearings for isolating the bearings from the surrounding environment and from the transmission.

15. A spindle unit according to claim 1 wherein the head of the spindle is configured to hold a rotatable tool.

16. A spindle unit according to claim 15 wherein the head of the spindle contains a socket for receiving a tool.

17. A spindle unit according to claim 16 and further comprising a tool received in the socket of the spindle, the tool being configured to effect a friction stir weld.

18. A spindle unit according to claim 5 wherein the web of the outer ring has spokes.

* * * * *